Aug. 28, 1934.    F. E. NEWTON    1,971,917
SCREW
Filed Feb. 17, 1933
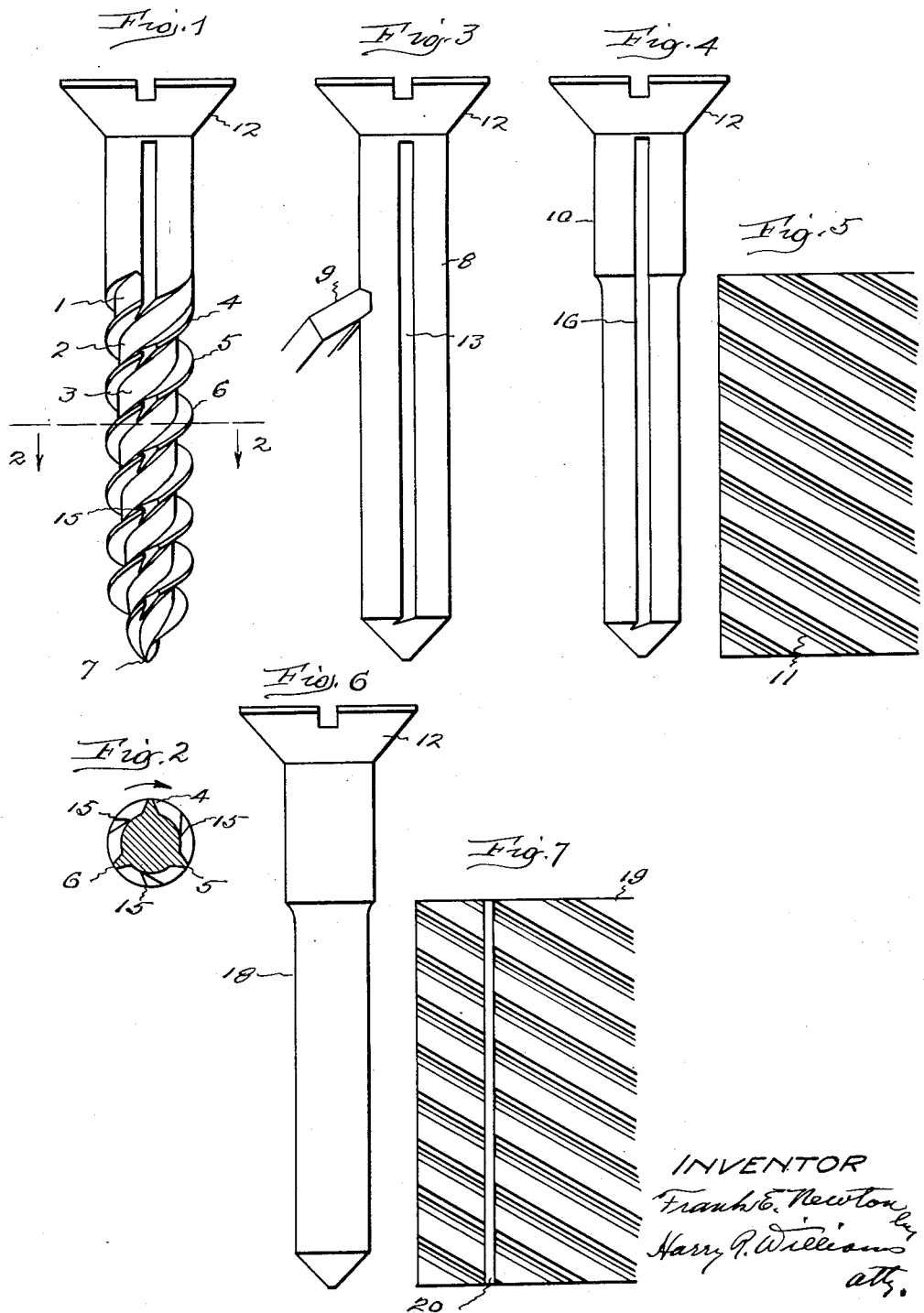
INVENTOR
Frank E. Newton
by Harry P. Williams
atty.

Patented Aug. 28, 1934

1,971,917

UNITED STATES PATENT OFFICE 1,971,917

SCREW

Frank E. Newton, Hartford, Conn.

Application February 17, 1933, Serial No. 657,188

5 Claims. (Cl. 80—6)

This invention relates more particularly to drive screws, that is, those screws which are designed to have threads so formed that they may be readily driven into wood by percussion, of the character illustrated and described in Patent No. 1,802,668, April 28, 1931. The invention is illustrated herein as embodied in a triple thread drive screw, but it is equally applicable to lag screws and the ordinary wood screws.

The object of the invention is to provide a screw with threads so formed that whether driven in or turned in, it will not work loose and unscrew under vibration to which it may be subjected when in use.

In attaining the invention the screw threads are provided with prongs or teeth that will not offer resistance to the driving of the screw but when the screw is set will engage fibers of the wood which expand into the spaces in front of the prongs or teeth and thus resist any tendency of the screw to turn backward and loosen.

This may be accomplished by first grooving the screw blank longitudinally on one or more sides, preferably with an undercut groove, and then forming the thread either by chasing the blank with the cutting tool or tools of the common screw machine, or by rolling the threads with the well known thread rolling dies, or the thread rolling dies may be provided with one or more ridges or knives that will groove the blank and form the teeth and threads as it is rolled.

In the accompanying drawing

Fig. 1 shows, on greatly enlarged scale, a side elevation of a triple thread drive screw which embodies the feature of this invention.

Fig. 2 is a transverse section of the screw on the plane indicated by the dotted line 2—2 on Fig. 1.

Fig. 3 shows a grooved blank and chasing cutter, illustrating one way in which this screw may be formed.

Fig. 4 illustrates another grooved blank.

Fig. 5 indicates the face of a die by which the thread may be rolled on the blank shown in Fig. 4, to produce a screw which embodies the invention.

Fig. 6 shows an ungrooved blank, and

Fig. 7 shows the face of a die by which the blank in Fig. 6 may be thread rolled and the threads notched to produce the invention.

The screw chosen to illustrate the invention has three spiral grooves 1, 2 and 3, separated by three threads 4, 5 and 6, which threads converge and vanish into a common point at the tip 7. The grooves may be formed by chasing a straight blank 8 with the tool 9 of an ordinary screw machine, or the threads may be formed on the reduced portion of a blank 10 by a pair of thread rolling dies 11 in the well known manner. There may be any required number of threads, and they may have any approved shape and suitable pitch which will allow them to be driven easily and straight into wood. A slotted flat head 12 is shown, but the shape of the head is immaterial.

Milled, pressed or stamped in the surface of the blank 8 is a groove 13 that is shown as extending longitudinally from the head to the tip. There may be one or more, preferably three, of these longitudinal grooves and they may start close under the head or at a distance therefrom, as desired. This grooved blank is then chased by the threading tool 9 in the usual way, and if the grooves are undercut on one edge, as is illustrated, the threads will be broken as they reach the grooves and sharp prongs or teeth 15 formed. The undercut is made on that side of the grooves which will result in the sharp points of the teeth projecting away from the direction of rotation of the screw when it is driven in and toward the unscrewing direction, or in other words upward with relation to the pitch of the threads. This allows the screw to be driven in without any interference by the teeth but any unscrewing turn of the screw causes the teeth to penetrate into the fibers of the material in which the screw is set and thus prevent the screw from turning loose.

The blank 10 also has one or more longitudinal grooves 16 which may or may not be undercut. The reduced portion of this blank is rolled between threading dies 11 in the usual manner, and the threads will be broken at the grooves so as to form prongs or teeth. When made in this manner the rolling coaction between the blank and dies tends to stretch or draw the metal of the screw into the grooves and thus elongate the teeth.

If the blank, such as 18, is not grooved before the threads are formed and the threads are to be rolled, a thread rolling die 19 may be provided with one or more ridges or blades 20 inserted transversely across its threading face, which ridges or blades will cause such grooves as will produce the desired prongs or teeth at the same time that the threads are rolled.

The invention claimed is:

1. The method of producing a self locking screw which consists in subjecting the body of a blank to rolling pressure and by such pressure simultaneously forming a longitudinal groove in the blank body and a thread that is broken at intervals in the same longitudinal plane along the body so as to produce teeth adapted to resist the unscrewing of the screw.

2. The method of producing a self locking screw which consists in subjecting the body of a headed blank to rolling pressure and by such pressure simultaneously forming a longitudinal undercut groove in the blank body and a thread that is broken at intervals so as to produce teeth that project toward the head of the blank.

3. The method of producing a self locking screw which consists in subjecting the unbroken cylindrical body of a blank to rolling pressure and by such pressure simultaneously forming a thread on the blank body and teeth that project toward the screw head and are adapted to resist the unscrewing of the screw.

4. The method of producing a self locking screw which consists in subjecting the unbroken cylindrical body of a blank to rolling pressure and by such pressure forming a plurality of interrupted threads with teeth undercut adapted to resist the unscrewing of the screw.

5. The method of producing a self-locking screw which consists in subjecting the unbroken cylindrical body of a blank to rolling pressure and by such pressure forming a thread with a series of V-shaped notches on the body, the notches in said thread providing teeth which ease the inturning of the screw and resist the outturning of the screw.

FRANK E. NEWTON